(12) United States Patent
Yu et al.

(10) Patent No.: US 11,997,385 B2
(45) Date of Patent: May 28, 2024

(54) TILTLESS OPTICAL IMAGE STABILIZATION (OIS) CIRCUIT AND OIS DEVICE

(71) Applicant: Samsung Electro-Mechanics Co., Ltd., Suwon-si (KR)

(72) Inventors: Je Hyeon Yu, Suwon-si (KR); Ji Hwan Kim, Suwon-si (KR); Ja Hwi Cho, Suwon-si (KR); Youn Joong Lee, Suwon-si (KR); Young Bok Yoon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 316 days.

(21) Appl. No.: 17/209,567

(22) Filed: Mar. 23, 2021

(65) Prior Publication Data

US 2022/0146852 A1 May 12, 2022

(30) Foreign Application Priority Data

Nov. 9, 2020 (KR) .......................... 10-2020-0148661

(51) Int. Cl.
*H04N 23/68* (2023.01)
*G02B 27/64* (2006.01)
*G03B 5/00* (2021.01)

(52) U.S. Cl.
CPC ........... *H04N 23/68* (2023.01); *G02B 27/644* (2013.01); *G03B 5/00* (2013.01); *H04N 23/6812* (2023.01);
(Continued)

(58) Field of Classification Search
CPC .. H04N 23/68; H04N 23/6812; H04N 23/687; H04N 23/54; H04N 23/57;
(Continued)

(56) References Cited

U.S. PATENT DOCUMENTS

2006/0284495 A1* 12/2006 Seo ...................... H02K 11/215
348/208.4
2015/0103194 A1* 4/2015 Takeuchi ........... H04N 23/6812
348/208.6
(Continued)

FOREIGN PATENT DOCUMENTS

JP 2005-184122 A 7/2005
JP 2010-15107 A 1/2010
(Continued)

OTHER PUBLICATIONS

Notice of Reason for Rejection dated Oct. 27, 2021, in counterpart Korean Patent Application No. 10-2020-0148661 (8 pages in English and 6 pages in Korean).

*Primary Examiner* — Usman A Khan
(74) *Attorney, Agent, or Firm* — NSIP Law

(57) ABSTRACT

A tiltless OIS circuit includes a first signal processing unit generating a first direction-position detection signal and a tilt detection signal based on a first direction-first sensing signal and a first direction-second sensing signal, a control unit generating a first direction position control signal, a tilt control signal, and a second direction position control signal, based on the first direction-position detection signal, the tilt detection signal, and a second direction sensing signal, respectively, a second signal processing unit generating a first direction-first position control signal and a first direction-second position control signal based on the first direction position control signal and the tilt control signal, and a driving unit generating a first direction-first driving signal, a first direction-second driving signal, and a second direction driving signal, based on the first direction-first position control signal, the first direction-second position control signal, and the second direction position control signal, respectively.

18 Claims, 8 Drawing Sheets

(52) U.S. Cl.
CPC ... *H04N 23/687* (2023.01); *G03B 2205/0015* (2013.01); *G03B 2217/005* (2013.01)

(58) Field of Classification Search
CPC .. H04N 23/683; G02B 27/644; G02B 27/646; G03B 5/00; G03B 2205/0015; G03B 2217/005; G03B 30/00; G03B 2205/0007
USPC .................................................. 348/208.99
See application file for complete search history.

(56) References Cited

U.S. PATENT DOCUMENTS

| | | | |
|---|---|---|---|
| 2015/0146024 A1 | 5/2015 | Takeuchi | |
| 2015/0146137 A1* | 5/2015 | Zohrabyan | G02B 27/64 349/75 |
| 2015/0160426 A1 | 6/2015 | Chao et al. | |
| 2016/0011393 A1* | 1/2016 | Kim | G02B 27/646 359/698 |
| 2016/0248978 A1 | 8/2016 | Nishihara | |
| 2016/0327806 A1 | 11/2016 | Kasamatsu | |
| 2019/0324348 A1 | 10/2019 | Pang et al. | |

FOREIGN PATENT DOCUMENTS

| | | | |
|---|---|---|---|
| JP | 2010015107 A | * | 1/2010 |
| JP | 2016-152602 A | | 8/2016 |
| JP | 2017-90821 A | | 5/2017 |
| KR | 10-2006-0131676 A | | 12/2006 |
| KR | 10-2015-0045463 A | | 4/2015 |
| KR | 10-2015-0061561 A | | 6/2015 |
| KR | 10-2019-0115122 A | | 10/2019 |
| KR | 10-2019-0123651 A | | 11/2019 |

* cited by examiner

TILTLESS OPTICAL IMAGE STABILIZATION (OIS) CIRCUIT AND OIS DEVICE

CROSS-REFERENCE TO RELATED APPLICATION(S)

This application claims the benefit under 35 USC 119(a) of Korean Patent Application No. 10-2020-0148661 filed on Nov. 9, 2020, in the Korean Intellectual Property Office, the entire disclosure of which is incorporated herein by reference for all purposes.

BACKGROUND

1. Field

The present disclosure relates to a tiltless optical image stabilization (OIS) circuit and a tiltless OIS device.

2. Description of the Background

In general, a camera module applied to electronic devices such as smartphones or the like is increasingly required to have high performance in terms of resolution, an optical image stabilization (OIS) function, an autofocusing (AF) function, or the like, and miniaturization thereof is also required.

In addition, as electronic devices are miniaturized, components in a substrate of the camera module are gradually becoming more integrated, and accordingly, there is a demand to prevent magnetic field interference between the components in the substrate.

For example, a conventional camera module having an OIS control function may include a structure having two layers of a ball guide for X-axis movement and a ball guide for Y-axis movement. Since this dual layer ball guide structure may be disadvantageous in decreasing a thickness (slimming), it may be necessary to remove the ball guide and allow a lens module to move freely on the X-axis and Y-axis for slimming.

However, if the lens module is allowed to move freely without a ball guide, there may be a disadvantage in that tilt of the lens module may occur. Therefore, in the structure of the conventional camera module, it was difficult to detect tilt and control tilt.

Accordingly, in a camera module employing a structure in which a dual layer ball guide structure is changed to a monolayer ball guide structure for slimming, there is a need for a technology for controlling tilt that may occur.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a tiltless optical image stabilization (OIS) circuit includes a first signal processing unit generating a first direction-position detection signal based on a first direction-first sensing signal from a first direction-first position detection sensor disposed on a housing of a camera module and a first direction-second sensing signal from a first direction-second position detection sensor disposed on the housing, and generating a tilt detection signal based on the first direction-first sensing signal and the first direction-second sensing signal; a control unit generating a first direction position control signal, a tilt control signal, and a second direction position control signal, based on the first direction-position detection signal, the tilt detection signal, and a second direction sensing signal from a second direction-position detection sensor disposed on the housing, respectively; a second signal processing unit generating a first direction-first position control signal and a first direction-second position control signal based on the first direction position control signal and the tilt control signal; and a driving unit generating a first direction-first driving signal, a first direction-second driving signal, and a second direction driving signal, based on the first direction-first position control signal, the first direction-second position control signal, and the second direction position control signal, respectively.

The first signal processing unit may include a first operation unit performing an average calculation on the first direction-first sensing signal and the first direction-second sensing signal, to generate the first direction-position detection signal, and a second operation unit subtracting the first direction-second sensing signal from the first direction-first sensing signal, to generate the tilt detection signal.

The control unit may include a first directional PID controller generating the first direction position control signal by PID control for the first direction-position detection signal, a tilt PID controller generating the tilt control signal by PID control for the tilt detection signal, and a second directional PID controller generating the second direction position control signal by PID control for the second direction sensing signal.

The second signal processing unit may include a third operation unit adding the first direction position control signal and the tilt control signal to generate the first direction-first position control signal, and a fourth operation unit subtracting the tilt control signal from the first direction position control signal to generate the first direction-second position control signal.

The driving unit may include a first direction-first driver generating the first direction-first driving signal based on the first direction-first position control signal, a first direction-second driver generating the first direction-second driving signal based on the first direction-second position control signal, and a second direction driver generating the second direction driving signal based on the second direction position control signal.

The tiltless OIS circuit may further include a tilt correction unit configured to perform and output first correction and second correction of the first direction position control signal input from the control unit, to the third operation unit and the fourth operation unit, and perform and output third correction and fourth correction of the tilt control signal input from the control unit, to the third operation unit and the fourth operation unit.

The tilt correction unit may include a first corrector performing and outputting the first correction of the first direction position control signal to the second signal processing unit, a second corrector performing and outputting the second correction of the first direction position control signal to the second signal processing unit, a third corrector performing and outputting the third correction of the tilt control signal to the second signal processing unit, and a fourth corrector performing and outputting the fourth correction of the tilt control signal to the second signal processing unit.

The third operation unit of the second signal processing unit may add a first correction control signal corrected by the first corrector and a third correction control signal corrected by the third corrector, to generate the first direction-first position control signal, and the fourth operation unit of the second signal processing unit may subtract a fourth correction control signal corrected by the fourth corrector from a second correction control signal corrected by the second corrector, to generate the first direction-second position control signal.

The camera module may include a lens barrel disposed in the housing, and the tiltless OIS circuit, wherein the lens barrel may be configured to be driven in response to the first direction-first driving signal, the first direction-second driving signal, and the second direction driving signal.

In another general aspect, a tiltless optical image stabilization (OIS) device includes a first driving coil and a second driving coil, opposing a first direction detection target disposed on a lens barrel and arranged adjacent to each other on a housing spaced apart from the lens barrel, a first direction-first position detection sensor disposed on the housing and detecting a position of the first direction detection target, a first direction-second position detection sensor disposed on the housing and detecting the position of the first direction detection target, a third driving coil disposed on the housing to oppose a second direction detection target disposed on the lens barrel, a second direction-position detection sensor disposed on the housing and detecting a position of the second direction detection target, a first signal processing unit generating a first direction-position detection signal based on a first direction-first sensing signal from the first direction-first position detection sensor and a first direction-second sensing signal from the first direction-second position detection sensor, and generating a tilt detection signal based on the first direction-first sensing signal and the first direction-second sensing signal, a control unit generating a first direction position control signal, a tilt control signal, and a second direction position control signal, based on the first direction-position detection signal, the tilt detection signal, and a second direction sensing signal from the second direction-position detection sensor, respectively, a second signal processing unit generating a first direction-first position control signal and a first direction-second position control signal based on the first direction position control signal and the tilt control signal, and a driving unit generating a first direction-first driving signal, a first direction-second driving signal, and a second direction driving signal, based on the first direction-first position control signal, the first direction-second position control signal, and the second direction position control signal, respectively.

A camera module may include the tiltless OIS device, wherein the lens barrel may be configured to be driven perpendicular to an optical axis of the lens barrel in response to the first direction-first driving signal, the first direction-second driving signal, and the second direction driving signal.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
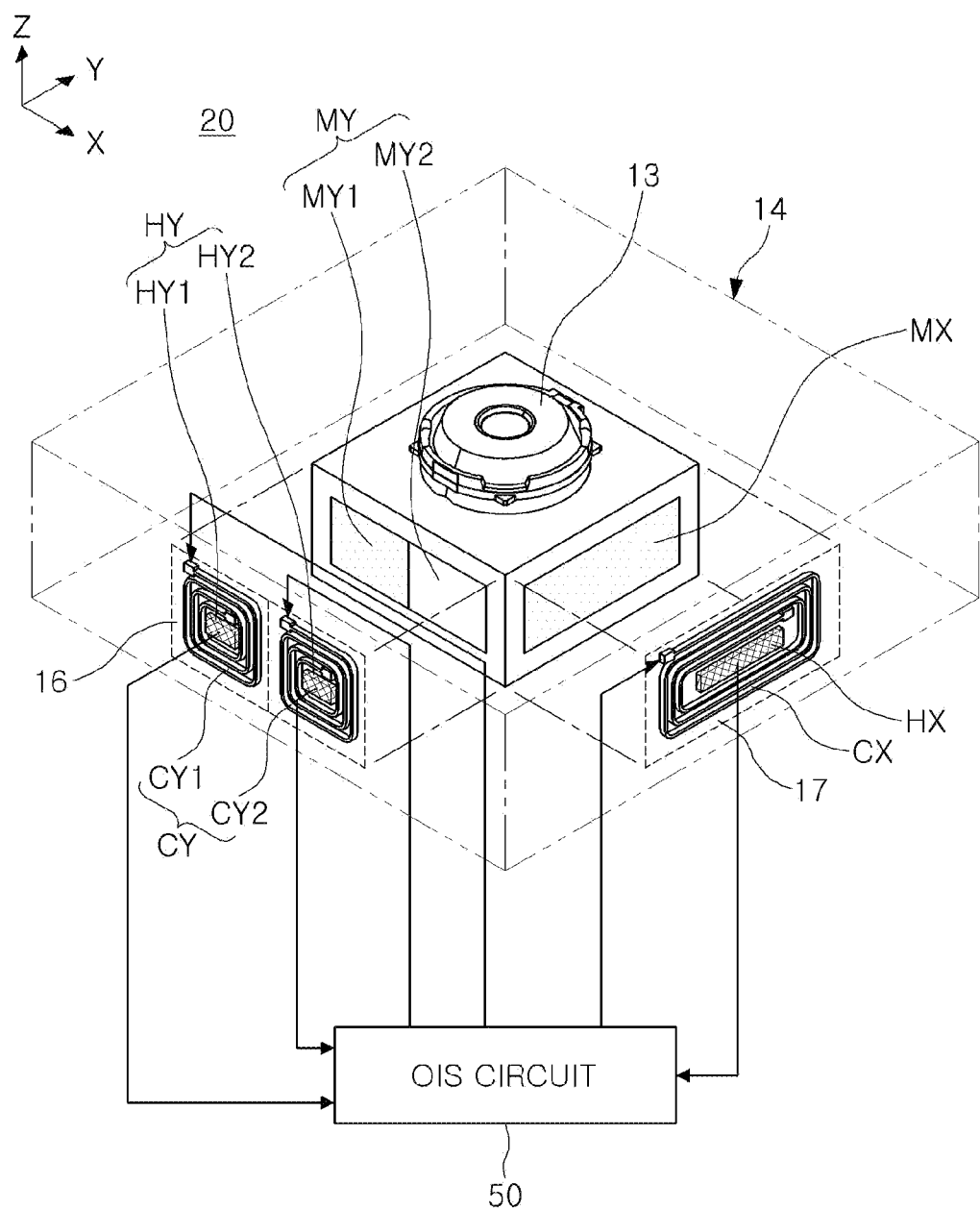
FIG. 1 is a view of a camera module to which an optical image stabilization (OIS) device according to an example embodiment of the present disclosure is applied.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of functions and constructions that would be well known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is noted that use of the term "may" with respect to an example or embodiment, for example, as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or a part of the whole element less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," "lower," and the like may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure is to provide a tiltless OIS circuit and a tiltless OIS device, including two driving coils driving in any one direction, perpendicular to an optical axis of a lens, for tilt control of a camera module, and tilting the two driving coils, and separately performing tilt control and position movement control on the two driving coils.

Hereinafter, example embodiments of the present disclosure will be described in detail with reference to the accompanying drawings such that those skilled in the art may easily carry out the present disclosure.

FIG. 1 is a view of a camera module to which an optical image stabilization (OIS) device according to an example embodiment of the present disclosure is applied.

Referring to FIG. 1, an OIS device 20 included in a camera module may include a lens barrel 13, a housing 14, a first direction detection target MY, a second direction detection target MX, first direction driving coils CY including a first driving coil CY1 and a second driving coil CY2, a third driving coil CX, a first direction detection sensor HY including a first direction-first position detection sensor HY1 and a first direction-second position detection sensor HY2, a second direction-position detection sensor HX, and an OIS circuit 50.

The lens barrel 13 may be disposed to move inside the housing 14, may include a plurality of lenses, may move in a Z-axis direction, an optical axis for AF, and may move in a Y-axis and/or X-axis direction for OIS, perpendicular to the optical axis. The housing 14 may be spaced apart from the lens barrel 13, and may be fixed to the camera module.

The first direction detection target MY may be disposed on one side of the lens barrel 13. The second direction detection target MX may be disposed on an other side of the lens barrel 13. For example, the first direction detection target MY and the second direction detection target MX may be magnets.

The first driving coil CY1 and the second driving coil CY2 may be arranged adjacent to each other on the housing 14 spaced apart from the lens barrel 13. The third driving coil CX may be disposed on the housing 14 to oppose the second direction detection target MX disposed on the lens barrel 13.

For example, the first driving coil CY1 and the second driving coil CY2 may be mounted on a first substrate 16, and the first substrate 16 may be disposed on the housing 14. In addition, the third driving coil CX may be mounted on a second substrate 17.

The first direction-first position detection sensor HY1 may be disposed on the housing 14 to detect a position of the first direction detection target MY. The first direction-second position detection sensor HY2 may be disposed on the housing 14 to detect the position of the first direction detection target MY. The second direction-position detection sensor HX may be disposed on the housing 14 to detect a position of the second direction detection target MX.

For example, the first direction-first position detection sensor HY1 may be disposed on the first driving coil CY1, the first direction-second position detection sensor HY2 may be disposed on the second driving coil CY2, and the second direction-position detection sensor HX may be disposed on the third driving coil CX.

For example, the first direction-first position detection sensor HY1 and the first direction-second position detection sensor HY2 may be connected to the OIS circuit 50, such that directions of detection values according to positions of corresponding magnets are the same.

The OIS circuit 50 may output corresponding driving signals, based on a plurality of sensing signals from the first direction-first position detection sensor HY1, the first direction-second position detection sensor HY2, and the second direction-position detection sensor HX, to the first driving coil CY1, the second driving coil CY2, and the third driving coil CX, respectively.

In the specification, for example, if the optical axis of the lens barrel 13 with respect to the plurality of lenses is the Z direction, a direction perpendicular to the optical axis may be referred to as the Y-axis direction and the X-axis direction. In addition, if a first direction is the Y-axis direction, a second direction may be referred to as the X-axis direction. As another example, if a first direction is the X-axis direction, a second direction may be referred to as the Y-axis direction. In the description of the present disclosure, for convenience of explanation, the first direction is referred to as the Y-axis direction and the second direction is referred to as the X-axis direction, but the present disclosure is not limited thereto.

For each of the drawings of the present disclosure, unnecessarily duplicated descriptions may be omitted for the same reference numerals and components having the same functions, and possible differences for each of the drawings may be described.

Figure 2:
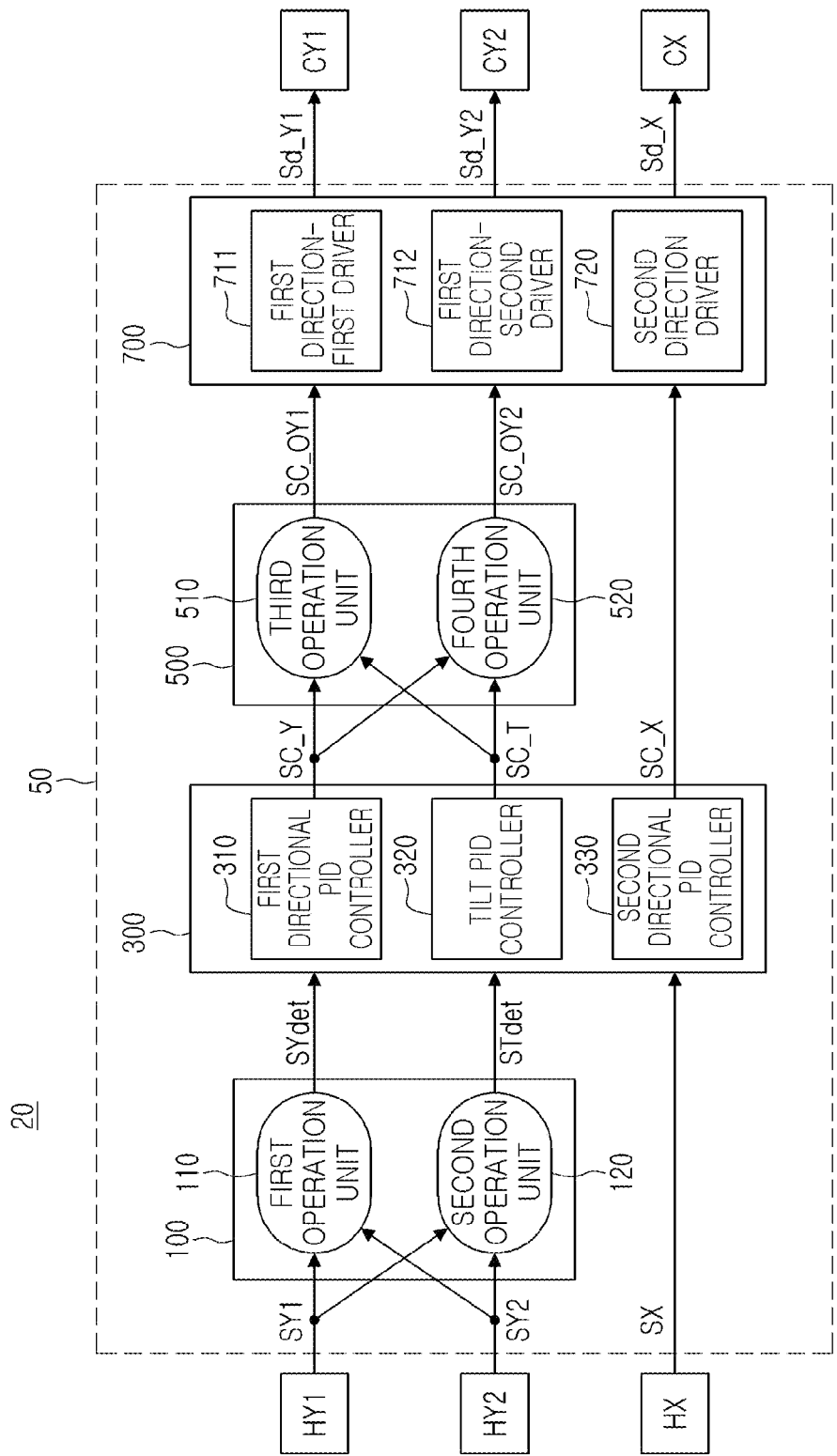
FIG. 2 is a view of an OIS device according to an example embodiment of the present disclosure.

FIG. 2 is a view of an OIS device according to an example embodiment of the present disclosure.

Referring to FIG. 2, as described above, an OIS device 20 may include a first direction-first position detection sensor HY1, a first direction-second position detection sensor HY2, a second direction-position detection sensor HX, a first driving coil CY1, a second driving coil CY2, a third driving coil CX, and an OIS circuit 50.

The OIS circuit 50 may include a first signal processing unit 100, a control unit 300, a second signal processing unit 500, and a driving unit 700.

The first signal processing unit 100 may generate a first direction-position detection signal SYdet and a tilt detection signal STdet, based on a first direction-first sensing signal SY1 from the first direction-first position detection sensor HY1 disposed on a housing 14, and a first direction-second sensing signal SY2 from the first direction-second position detection sensor HY2 disposed on the housing 14.

The control unit 300 may generate a first direction position control signal SC_Y, a tilt control signal SC_T, and a second direction position control signal SC_X, based on the first direction-position detection signal SYdet, the tilt detection signal STdet, and a second direction sensing signal SX from the second direction-position detection sensor HX disposed on the housing 14.

The second signal processing unit 500 may generate a first direction-first position control signal SC_OY1 and a first direction-second position control signal SC_OY2 based on the first direction position control signal SC_Y and the tilt control signal SC_T.

The driving unit 700 may generate a first direction-first driving signal Sd_Y1, a first direction-second driving signal Sd_Y2, and a second direction driving signal Sd_X, based on the first direction-first position control signal SC_OY1, the first direction-second position control signal SC_OY2, and the second direction position control signal SC_X, respectively.

Figure 3:
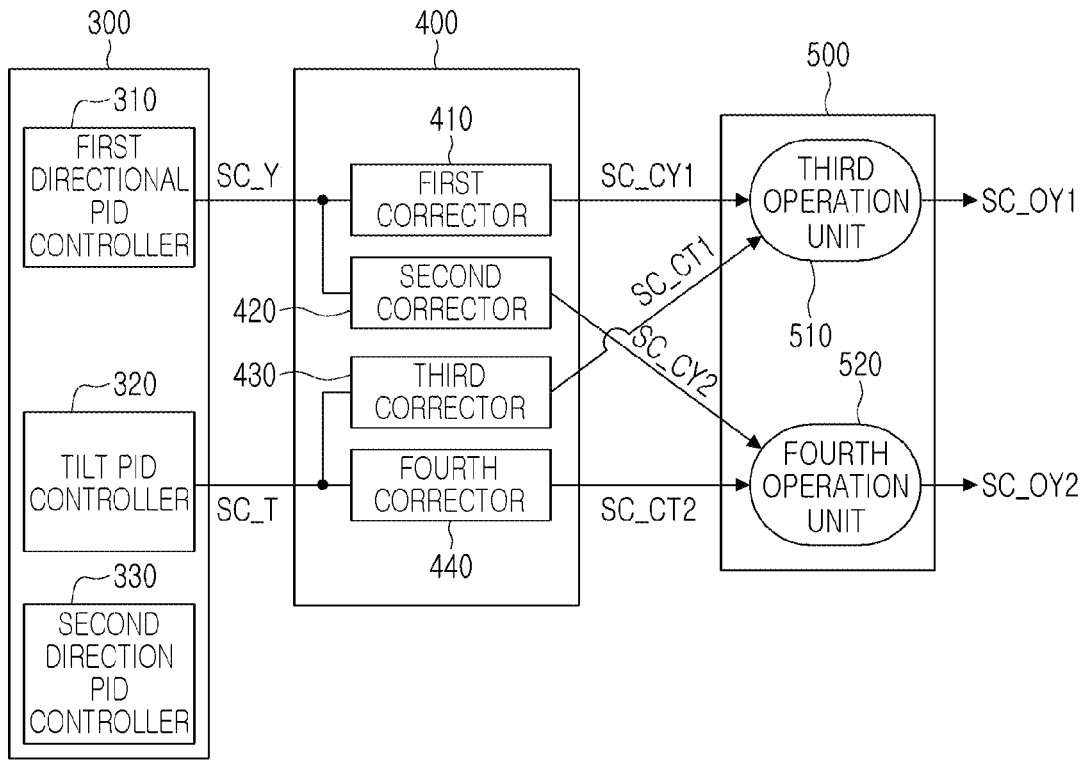
FIG. 3 is a view of a tilt correction unit for severe tilt correction according to an example embodiment of the present disclosure.

FIG. 3 is a view of a tilt correction unit for severe tilt correction according to an example embodiment of the present disclosure.

Referring to FIG. 3, for example, an OIS circuit 50 may include a tilt correction unit 400.

The tilt correction unit 400 may perform and output first correction and second correction of a first direction position control signal SC_Y input from a control unit 300, to a third operation unit 510 and a fourth operation unit 520, and may perform and output third correction and fourth correction of a tilt control signal SC_T input from the control unit 300, to the third operation unit 510 and the fourth operation unit 520.

Figure 4:
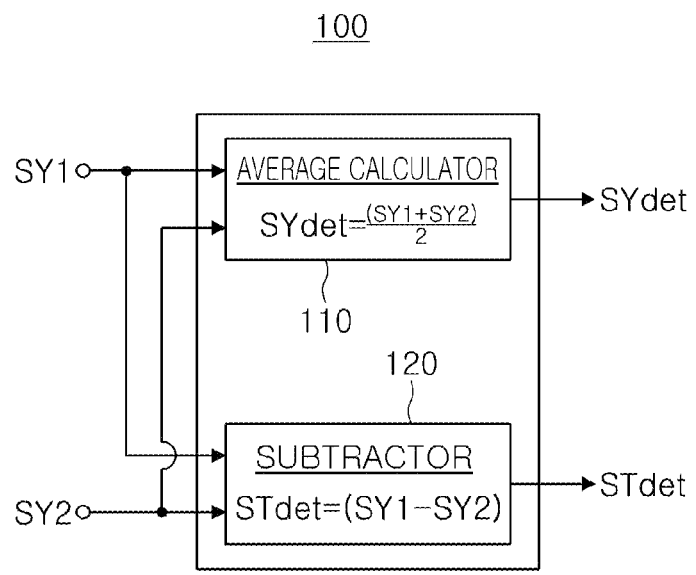
FIG. 4 is a configuration view of a first signal processing unit according to an example embodiment of the present disclosure.

FIG. 4 is a configuration view of a first signal processing unit according to an example embodiment of the present disclosure.

Referring to FIGS. 2 and 4, for example, the first signal processing unit 100 may include a first operation unit 110 and a second operation unit 120.

The first operation unit 110 may perform an average calculation on the first direction-first sensing signal SY1 and the first direction-second sensing signal SY2, to generate the first direction-position detection signal SYdet.

The second operation unit 120 may subtract the first direction-second sensing signal SY2 from the first direction-first sensing signal SY1, to generate the tilt detection signal STdet.

Referring to FIGS. 2 to 4, the control unit 300 may include a first directional proportional-integral-derivative (PID) controller 310, a tilt PID controller 320, and a second directional PID controller 330.

The first directional PID controller 310 may generate the first direction position control signal SC_Y by PID control for the first direction-position detection signal SYdet.

The tilt PID controller 320 may generate the tilt control signal SC_T by PID control for the tilt detection signal STdet.

The second directional PID controller 330 may generate the second direction position control signal SC_X by PID control for the second direction sensing signal SX.

Usually, in a PID controller, a PID coefficient for PID control may be set. For example, the first directional PID controller 310 and the tilt PID controller 320 may apply different PID coefficients for position movement and tilt control. For example, the first directional PID controller 310 of which target value is changed may be optimized for a settling time, and the tilt PID controller 320 may have a fixed target value to apply a PID coefficient optimized for in-place control.

Figure 5:
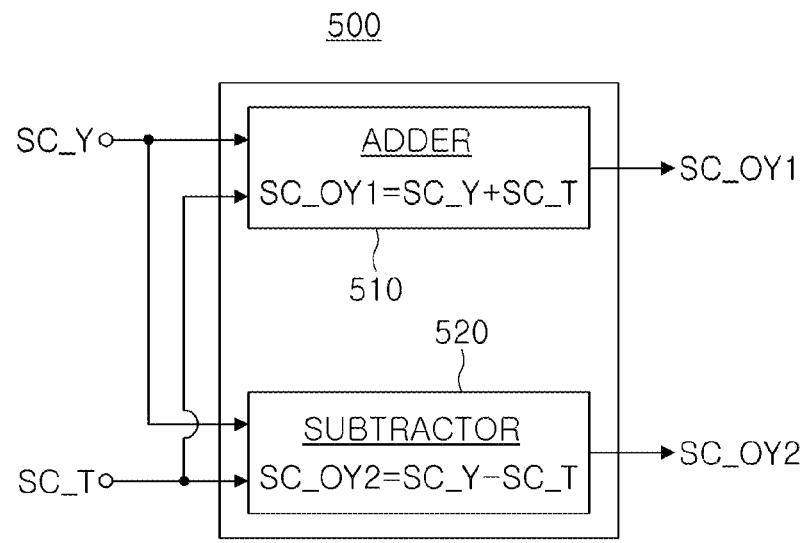
FIG. 5 is a configuration view of a second signal processing unit according to an example embodiment of the present disclosure.

FIG. 5 is a configuration view of a second signal processing unit according to an example embodiment of the present disclosure.

Referring to FIGS. 2 and 5, the second signal processing unit 500 may include a third operation unit 510 and a fourth operation unit 520.

The third operation unit 510 may add the first direction position control signal SC_Y and the tilt control signal SC_T to generate the first direction-first position control signal SC_OY1. For example, the third operation unit 510 may include an adder.

The fourth operation unit 520 may subtract the tilt control signal SC_T from the first direction position control signal SC_Y to generate the first direction-second position control signal SC_OY2. For example, the fourth operation unit 520 may include a subtractor.

Referring to FIG. 2, the driving unit 700 may include a first direction-first driver 711, a first direction-second driver 712, and a second direction driver 720.

The first direction-first driver 711 may generate the first direction-first driving signal Sd_Y1 based on the first direction-first position control signal SC_OY1.

The first direction-second driver 712 may generate the first direction-second driving signal Sd_Y2 based on the first direction-second position control signal SC_OY2.

The second direction driver 720 may generate the second direction driving signal Sd_X based on the second direction position control signal SC_X.

Figure 6:
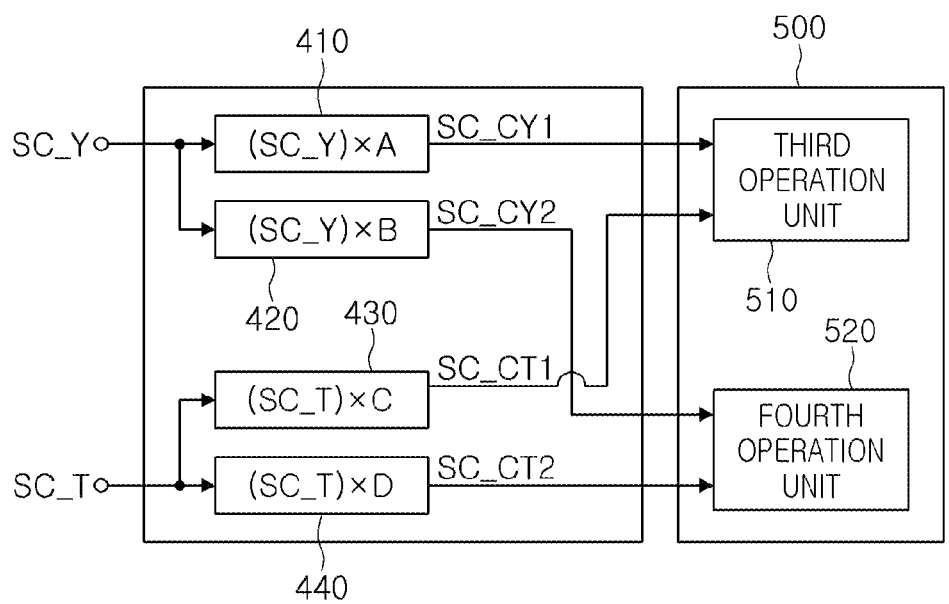
FIG. 6 is a configuration view of the tilt correction unit of FIG. 3.

FIG. 6 is a configuration view of the tilt correction unit of FIG. 3.

Referring to FIG. 6, the tilt corrector 400 may include a first corrector 410, a second corrector 420, a third corrector 430, and a fourth corrector 440.

The first corrector 410 may perform and output first correction of a first direction position control signal SC_Y to a second signal processing unit 500. For example, the first corrector 410 may correct the first direction position control signal SC_Y by multiplying the first direction position control signal SC_Y by a first correction factor A.

The second corrector 420 may perform and output second correction of the first direction position control signal SC_Y to the second signal processing unit 500. For example, the second corrector 420 may correct the first direction position control signal SC_Y by multiplying the first direction position control signal SC_Y by a second correction factor B.

The third corrector 430 may perform and output third correction of a tilt control signal SC_T to the second signal processing unit 500. For example, the third corrector 430 may correct the tilt control signal SC_T by multiplying the tilt control signal SC_T by a third correction factor C.

The fourth corrector 440 may perform and output fourth correction of the tilt control signal SC_T to the second signal processing unit 500. For example, the fourth corrector 440 may correct the tilt control signal SC_T by multiplying the tilt control signal SC_T by a fourth correction factor D.

In addition, referring to FIGS. 2, 3, and 6, the third operation unit 510 of the second signal processing unit 500 may add a first correction control signal SC_CY1 corrected by the first corrector 410 and a third correction control signal SC_CT1 corrected by the third corrector 430, to generate the first direction-first position control signal SC_OY1.

The fourth operation unit 520 of the second signal processing unit 500 may subtract a fourth correction control signal SC_CT2 corrected by the fourth corrector 440 from a second correction control signal SC_CY2 corrected by the second corrector 420, to generate the first direction-second position control signal SC_OY2.

Figure 7:
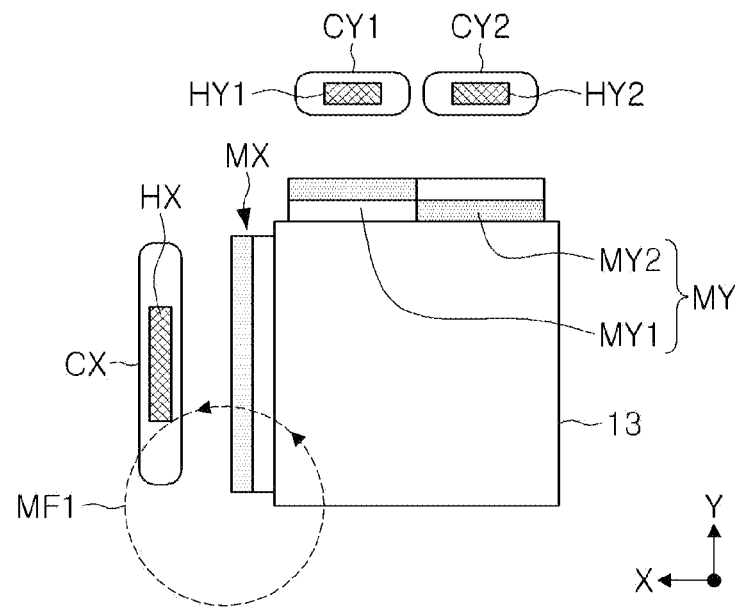
FIG. 7 illustrates a first direction detection target and a second direction detection target according to an example embodiment of the present disclosure.

FIG. 7 illustrates a first direction detection target and a second direction detection target according to an example embodiment of the present disclosure.

Referring to FIG. 7, a first direction detection target MY and a second direction detection target MX may be a metal or a magnet, respectively, but are not limited thereto.

For example, the first direction detection target MY may include two polarized magnets MY1 and MY2 respectively opposing a first driving coil CY1 and a second driving coil CY2. The two polarized magnets MY1 and MY2 may have different polarization directions. In using the two polarized magnets MY1 and MY2 as described above, a relatively small magnetic field may be formed to relatively reduce peripheral influence, as compared to a relatively large magnetic field.

For example, the second direction detection target MX may be a polarized magnet.

When the second direction detection target MX includes one polarized magnet, a large magnetic field MF1 may be formed by the one polarized magnet. In this case, the large magnetic field MF1 may adversely affect the surroundings.

In this case, according to Faraday's law, leakage magnetic flux may be formed from an N pole to an S pole. Since a unipolar magnet may have a relatively long leakage magnetic flux, a relatively large magnetic field may be formed.

Figure 8:
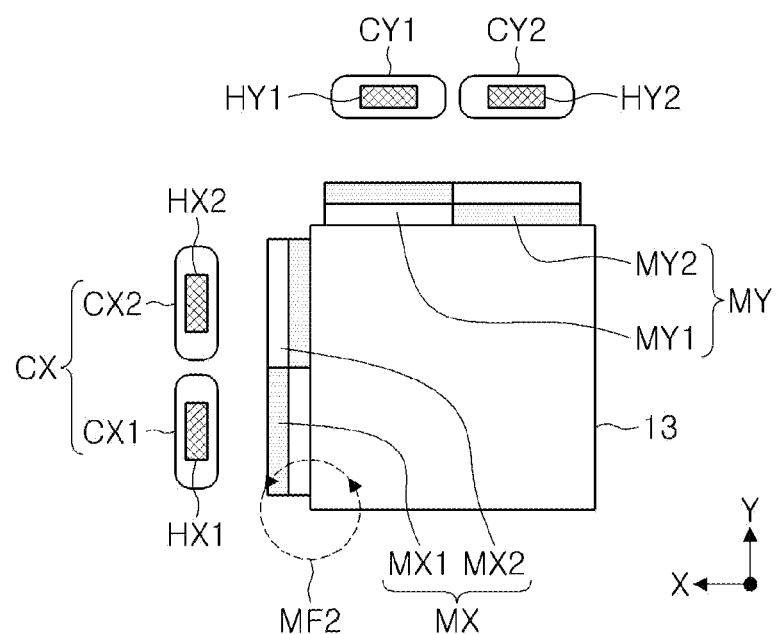
FIG. 8 illustrates a first direction detection target and a second direction detection target according to an example embodiment of the present disclosure.

FIG. 8 illustrates a first direction detection target and a second direction detection target according to an example embodiment of the present disclosure.

Referring to FIG. 8, for example, a third driving coil CX may include two driving coils CX1 and CX2. A second direction-position detection sensor may include two second direction-position detection sensors HX1 and HX2 disposed on the two driving coils CX1 and CX2, respectively. A second direction detection target MX may include two polarized magnets MX1 and MX2 respectively opposing the two driving coils CX1 and CX2. The two polarized magnets MX1 and MX2 may have different polarization directions.

Therefore, when the second direction detection target MX includes two polarized magnets, a relatively small magnetic field MF2 may be formed by the two polarized magnets, compared to the structure illustrated in FIG. 7. In this case, the small magnetic field MF2 may reduce adverse effects on the surroundings.

For example, as illustrated in FIG. 8, two coils may be disposed because the two polarized magnets are disposed for low magnetic field control in the second direction (for example, the X-axis direction). In this case, according to Faraday's law, leakage magnetic flux may be formed from an N pole to an S pole. Since the two polarized magnets may have a relatively short leakage magnetic flux, a relatively small magnetic field may be formed.

Figure 9:
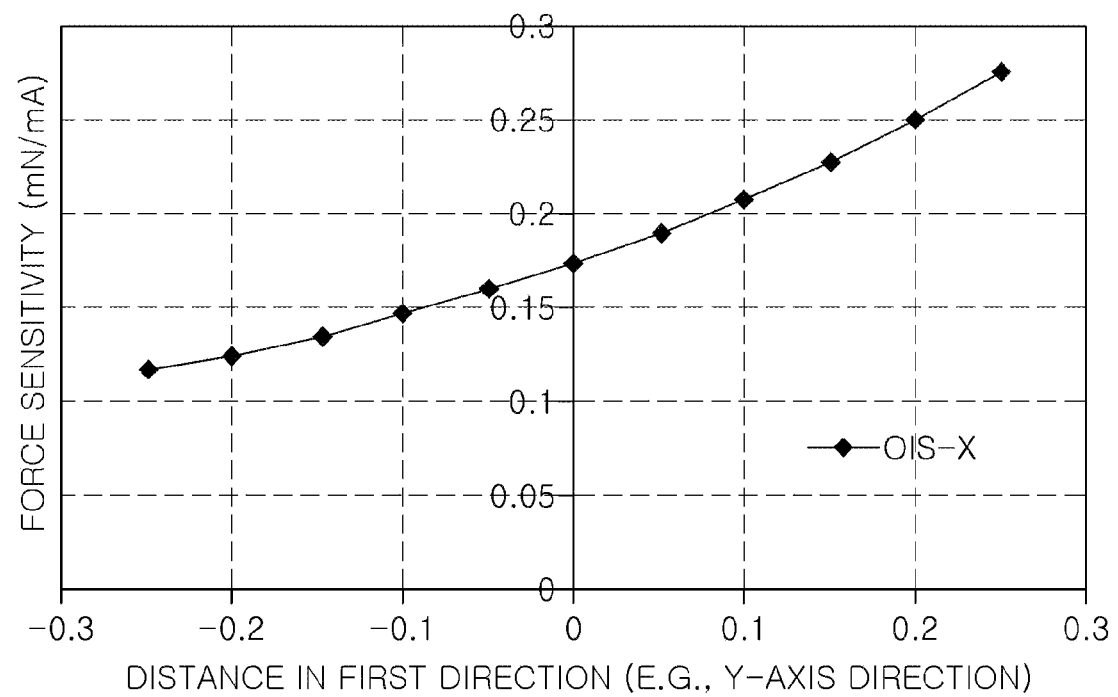
FIG. 9 is a graph illustrating a first direction distance-force sensitivity correlation.

FIG. 9 is a graph illustrating a first direction distance-force sensitivity correlation.

In FIG. 9, a horizontal axis may be a distance between a driving coil (for example, CY1) and a detection target (for example, MY1) in the first direction, and a vertical axis may be force sensitivity in (mN/mA).

A distance '0' on the horizontal axis is a middle position. A right side of the middle position may be a closer position between the driving coil and the detection target. A left side of the middle position may be a more distant position.

Referring to FIG. 9, it can be seen that force sensitivity in (mN/mA) varies according to a distance between a driving coil (for example, CY1) and a detection target (for example, MY1) in the first direction. As described above, when force sensitivity varies according to the distance, it means that driving force (force) exerted according to a distance may vary, and there may be a need to correct force sensitivity that varies according to the distance during tilt control.

For this reason, when tilt is severe, the tilt correction unit 400 as illustrated in FIGS. 3 and 6 may be required.

Referring to FIG. 9, an OIS device of a camera module to which the present disclosure is applied may be a structure in which a distance between a detection target (for example, a magnet) and a position sensor (for example, a Hall sensor), for example, an air gap, is changed. Therefore, driving force (force sensitivity) acting between the detection target (for example, a magnet) and the position sensor (for example, a Hall sensor) may change almost linearly depending on a position. For example, the smaller the air gap, the stronger the driving force.

Figure 10:
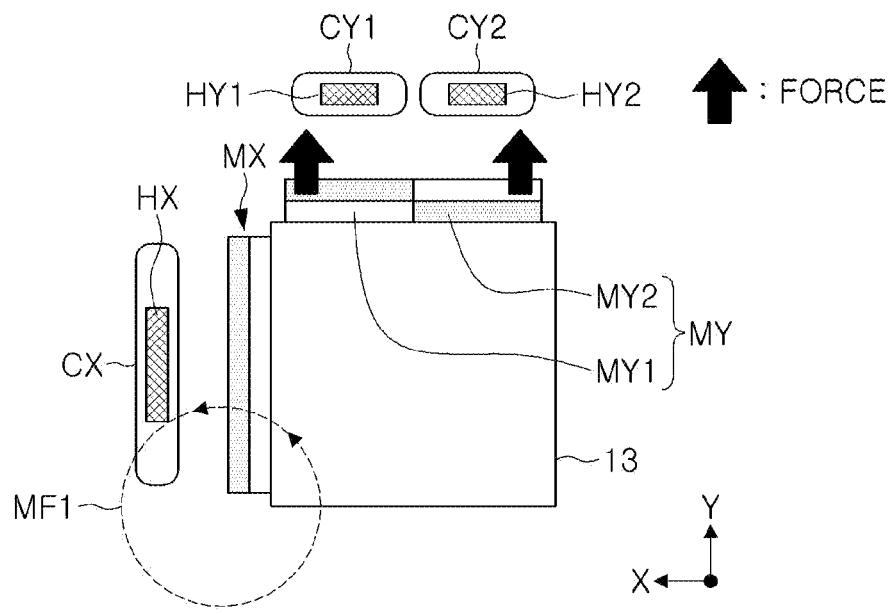
FIG. 10 is a view illustrating first direction position control according to an example embodiment of the present disclosure.

FIG. 10 is a view illustrating first direction position control according to an example embodiment of the present disclosure.

Referring to FIG. 10, for position control in the first direction (for example, the Y-axis direction), a first driving coil CY1 and a second driving coil CY2 may be operated to move positions thereof in the same direction with respect to the magnet.

Figure 11:
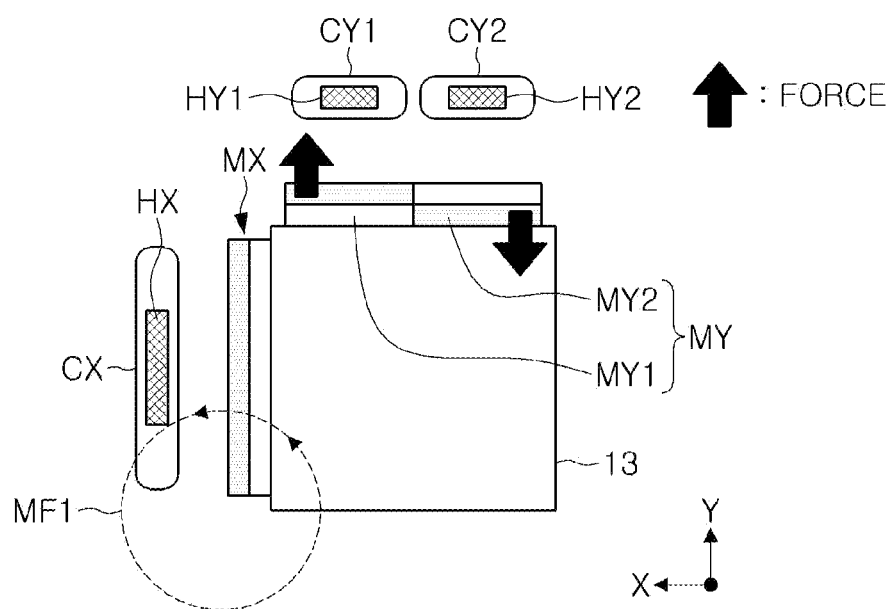
FIG. 11 is a view illustrating first direction tilt control according to an example embodiment of the present disclosure.

FIG. 11 is a view illustrating first direction tilt control according to an example embodiment of the present disclosure.

Referring to FIG. 11, for tilt control in the first direction (for example, the Y-axis direction), a first driving coil CY1 and a second driving coil CY2 may be operated to move positions thereof in different directions with respect to the magnet.

Figure 12:
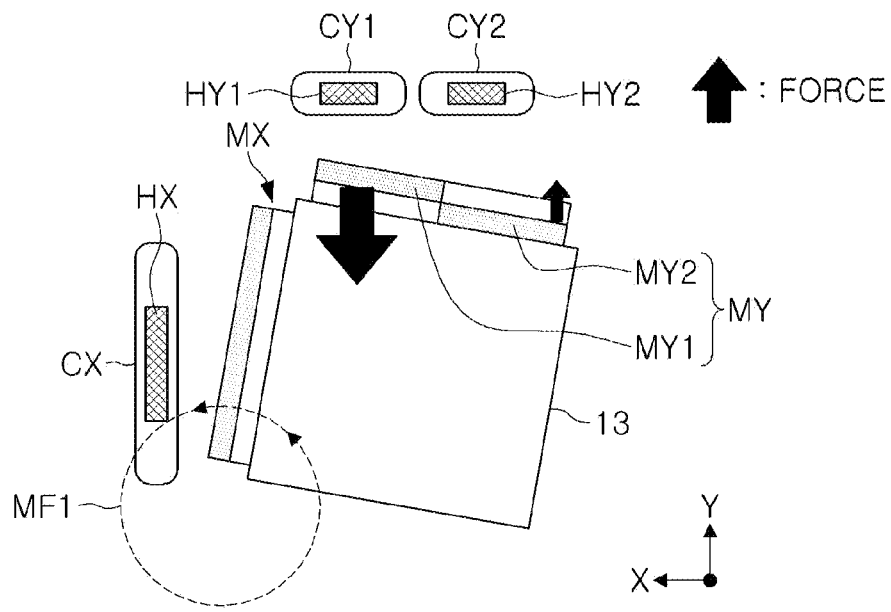
FIG. 12 is a view illustrating position control during severe tilt according to an example embodiment of the present disclosure.
Figure 13:
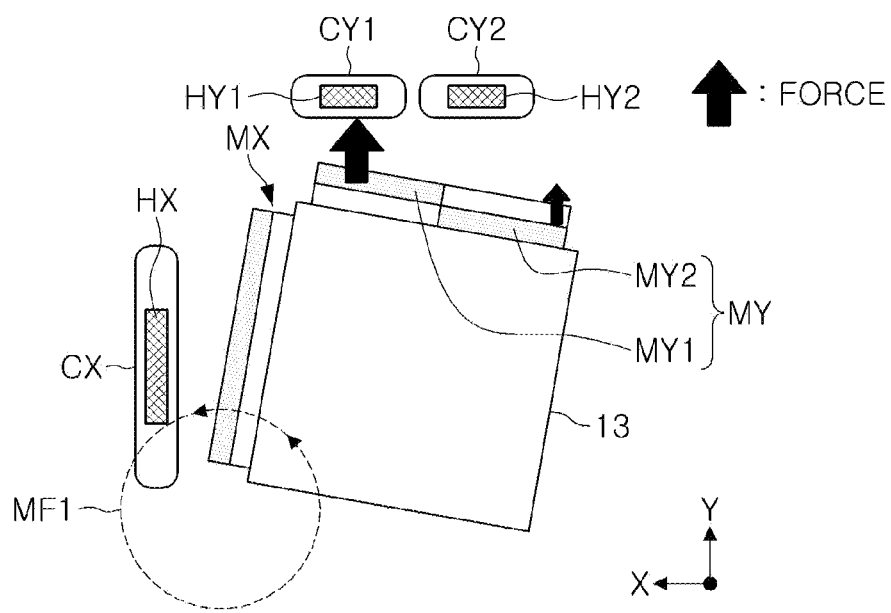
FIG. 13 is a view illustrating tilt control during severe tilt according to an example embodiment of the present disclosure.

FIG. 12 is a view illustrating position control during severe tilt, and FIG. 13 is a view illustrating tilt control during severe tilt according to example embodiments of the present disclosure.

Referring to FIG. 12, when tilt is severe, magnitudes of forces generated by driving signals acting in the same direction may be different from each other during position control.

Referring to FIG. 13, when tilt is severe, magnitudes of forces generated by driving signals acting in different directions may be different from each other during the tilt control.

Referring to FIGS. 12 and 13, when tilt is severe, to apply the same force, different currents should flow through a first direction-first coil (first driving coil CY1) and a first direction-second coil (second driving coil CY2) to balance force.

For example, in severe tilt, when power is driven with the same current, force may not be balanced. Therefore, interference may occur during tilt control and position control. During the tilt control, a relatively large force may be applied to the first coil CY1 and the position may move in a downward direction. Even in right position control, since the second coil CY2 may have a relatively large force, tilt may be more severe.

With such severe tilt, the tilt may be corrected by the tilt correction unit 400 as illustrated in FIGS. 3 and 6.

In the tilt correction unit 400, values proportional to the first direction-first sensing signal SY1 and the first direction-second sensing signal SY2 may be corrected with a linear equation with regard to currents of the first coil CY1 and the second coil CY2. When performing such correction, since current and driving force, which may be PID output values, may be proportional to each other, there may be an advantage in control thereof.

In addition, even when tilt is severe, force may be balanced, and in-place characteristics of the tilt PID controller 320 may be reinforced such that the tilt is not severe.

According to one or more example embodiments of the present disclosure as described herein, a tiltless OIS circuit and a tiltless OIS device, including two driving coils driving in any one direction, perpendicular to an optical axis of a lens, for tilt control of a camera module, and tilting the two driving coils, and separately performing tilt control and position movement control on the two driving coils, may reduce interference between components in a substrate.

While specific example embodiments have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A tiltless optical image stabilization (OIS) circuit comprising:
a first signal processing unit configured to generate a first direction-position detection signal based on a first direction-first sensing signal from a first direction-first position detection sensor disposed on a housing of a camera module and a first direction-second sensing signal from a first direction-second position detection sensor disposed on the housing, and generate a tilt detection signal based on the first direction-first sensing signal and the first direction-second sensing signal;
a control unit, connected to the first signal processing unit, configured to generate a first direction position control signal, a tilt control signal, and a second direction position control signal, based on the first direction-position detection signal, the tilt detection signal, and a second direction sensing signal from a second direction-position detection sensor disposed on the housing, respectively;
a second signal processing unit configured to generate a first direction-first position control signal and a first direction-second position control signal based on the first direction position control signal and the tilt control signal; and
a driving unit configured to generate a first direction-first driving signal, a first direction-second driving signal, and a second direction driving signal, based on the first direction-first position control signal, the first direction-second position control signal, and the second direction position control signal, respectively,
wherein the second signal processing snit is connected between the control unit and the driving unit.

2. The tiltless OIS circuit of claim 1, wherein the first signal processing unit comprises:
a first operation unit configured to perform an average calculation on the first direction-first sensing signal and the first direction-second sensing signal, to generate the first direction-position detection signal; and
a second operation unit configured to subtract the first direction-second sensing signal from the first direction-first sensing signal, to generate the tilt detection signal.

3. The tiltless OIS circuit of claim 1, wherein the control unit comprises:
a first directional proportional integral derivative (PID) controller configured to generate the first direction position control signal by PID control for the first direction-position detection signal;
a tilt PID controller configured to generate the tilt control signal by PID control for the tilt detection signal; and
a second directional PID controller configured to generate the second direction position control signal by PID control for the second direction sensing signal.

4. The tiltless OIS circuit of claim 1, wherein the second signal processing unit comprises:
a third operation unit configured to add the first direction position control signal and the tilt control signal to generate the first direction-first position control signal; and a fourth operation unit configured to subtract the tilt control signal from the first direction position control signal to generate the first direction-second position control signal.

5. The tiltless OIS circuit of claim 1, wherein the driving unit comprises:
a first direction-first driver configured to generate the first direction-first driving signal based on the first direction-first position control signal;
a first direction-second driver configured to generate the first direction-second driving signal based on the first direction-second position control signal; and
a second direction driver configured to generate the second direction driving signal based on the second direction position control signal.

6. The tiltless OIS circuit of claim 4, further comprising a tilt correction unit configured to perform and output first correction and second correction of the first direction position control signal input from the control unit, to the third operation unit and the fourth operation unit, and perform and output third correction and fourth correction of the tilt control signal input from the control unit, to the third operation unit and the fourth operation unit.

7. The tiltless OIS circuit of claim 6, wherein the tilt correction unit comprises:
a first corrector configured to perform and output the first correction of the first direction position control signal to the second signal processing unit;
a second corrector configured to perform and output the second correction of the first direction position control signal to the second signal processing unit;
a third corrector configured to perform and output the third correction of the tilt control signal to the second signal processing unit; and
a fourth corrector configured to perform and output the fourth correction of the tilt control signal to the second signal processing unit.

8. The tiltless OIS circuit of claim 7, wherein the third operation unit of the second signal processing unit adds a first correction control signal corrected by the first corrector and a third correction control signal corrected by the third corrector, to generate the first direction-first position control signal, and
the fourth operation unit of the second signal processing unit subtracts a fourth correction control signal corrected by the fourth corrector from a second correction control signal corrected by the second corrector, to generate the first direction-second position control signal.

9. The camera module comprising:
a lens barrel disposed in the housing; and
the tiltless OIS circuit of claim 1,
wherein the lens barrel is configured to be driven in response to the first direction-first driving signal, the first direction-second driving signal, and the second direction driving signal.

10. A tiltless optical image stabilization (OIS) device comprising:
a first driving coil and a second driving coil, opposing a first direction detection target disposed on a lens barrel and arranged adjacent to each other on a housing spaced apart from the lens barrel;
a first direction-first position detection sensor disposed on the housing and detecting a position of the first direction detection target;
a first direction-second position detection sensor disposed on the housing and detecting the position of the first direction detection target;
a third driving coil disposed on the housing to oppose a second direction detection target disposed on the lens barrel;
a second direction-position detection sensor disposed on the housing and detecting a position of the second direction detection target;
a first signal processing unit configured to generate a first direction-position detection signal based on a first direction-first sensing signal from the first direction-first position detection sensor and a first direction-second sensing signal from the first direction-second position detection sensor, and generate a tilt detection signal based on the first direction-first sensing signal and the first direction-second sensing signal;
a control unit, connected to the first signal processing unit, configured to generate a first direction position control signal, a tilt control signal, and a second direction position control signal, based on the first direction-position detection signal, the tilt detection signal, and a second direction sensing signal from the second direction-position detection sensor, respectively;
a second signal processing unit configured to generate a first direction-first position control signal and a first direction-second position control signal based on the first direction position control signal and the tilt control signal; and
a driving unit configured to generate a first direction-first driving signal, a first direction-second driving signal, and a second direction driving signal, based on the first direction-first position control signal, the first direction-second position control signal, and the second direction position control signal, respectively,
wherein the second signal processing unit is connected between the control unit and the driving unit.

11. The tiltless OIS device of claim 10, wherein the first signal processing unit comprises:
a first operation unit configured to perform an average calculation on the first direction-first sensing signal and the first direction-second sensing signal, to generate the first direction-position detection signal; and
a second operation unit configured to subtract the first direction-second sensing signal from the first direction-first sensing signal, to generate the tilt detection signal.

12. The tiltless OIS device of claim 10, wherein the control unit comprises:
a first directional proportional integral derivative (PID) controller configured to generate the first direction position control signal by PID control for the first direction-position detection signal;
a tilt PID controller configured to generate the tilt control signal by PID control for the tilt detection signal; and
a second directional PID controller configured to generate the second direction position control signal by PID control for the second direction sensing signal.

13. The tiltless OIS device of claim 10, wherein the second signal processing unit comprises:
a third operation unit configured to add the first direction position control signal and the tilt control signal to generate the first direction-first position control signal; and
a fourth operation unit configured to subtract the tilt control signal from the first direction position control signal to generate the first direction-second position control signal.

14. The tiltless OIS device of claim 10, wherein the driving unit comprises:
- a first direction-first driver configured to generate the first direction-first driving signal based on the first direction-first position control signal;
- a first direction-second driver configured to generate the first direction-second driving signal based on the first direction-second position control signal; and
- a second direction driver configured to generate the second direction driving signal based on the second direction position control signal.

15. The tiltless OIS device of claim 13, further comprising a tilt correction unit configured to perform and output first correction and second correction of the first direction position control signal input from the control unit, to the third operation unit and the fourth operation unit, and perform and output third correction and fourth correction of the tilt control signal input from the control unit, to the third operation unit and the fourth operation unit.

16. The tiltless OIS device of claim 15, wherein the tilt correction unit comprises:
- a first corrector configured to perform and output the first correction of the first direction position control signal to the second signal processing unit;
- a second corrector configured to perform and output the second correction of the first direction position control signal to the second signal processing unit;
- a third corrector configured to perform and output the third correction of the tilt control signal to the second signal processing unit; and
- a fourth corrector configured to perform and output the fourth correction of the tilt control signal to the second signal processing unit.

17. The tiltless OIS device of claim 16, wherein the third operation unit of the second signal processing unit adds a first correction control signal corrected by the first corrector and a third correction control signal corrected by the third corrector, to generate the first direction-first position control signal, and the fourth operation unit of the second signal processing unit subtracts a fourth correction control signal corrected by the fourth corrector from a second correction control signal corrected by the second corrector, to generate the first direction-second position control signal.

18. A camera module comprising the tiltless OIS device of claim 10, wherein the lens barrel is configured to be driven perpendicular to an optical axis of the lens barrel in response to the first direction-first driving signal, the first direction-second driving signal, and the second direction driving signal.

* * * * *